May 16, 1944.  DU BOIS EASTMAN ET AL  2,348,794
METHOD OF CATALYTIC CONVERSION OF HYDROCARBONS
Filed May 26, 1942
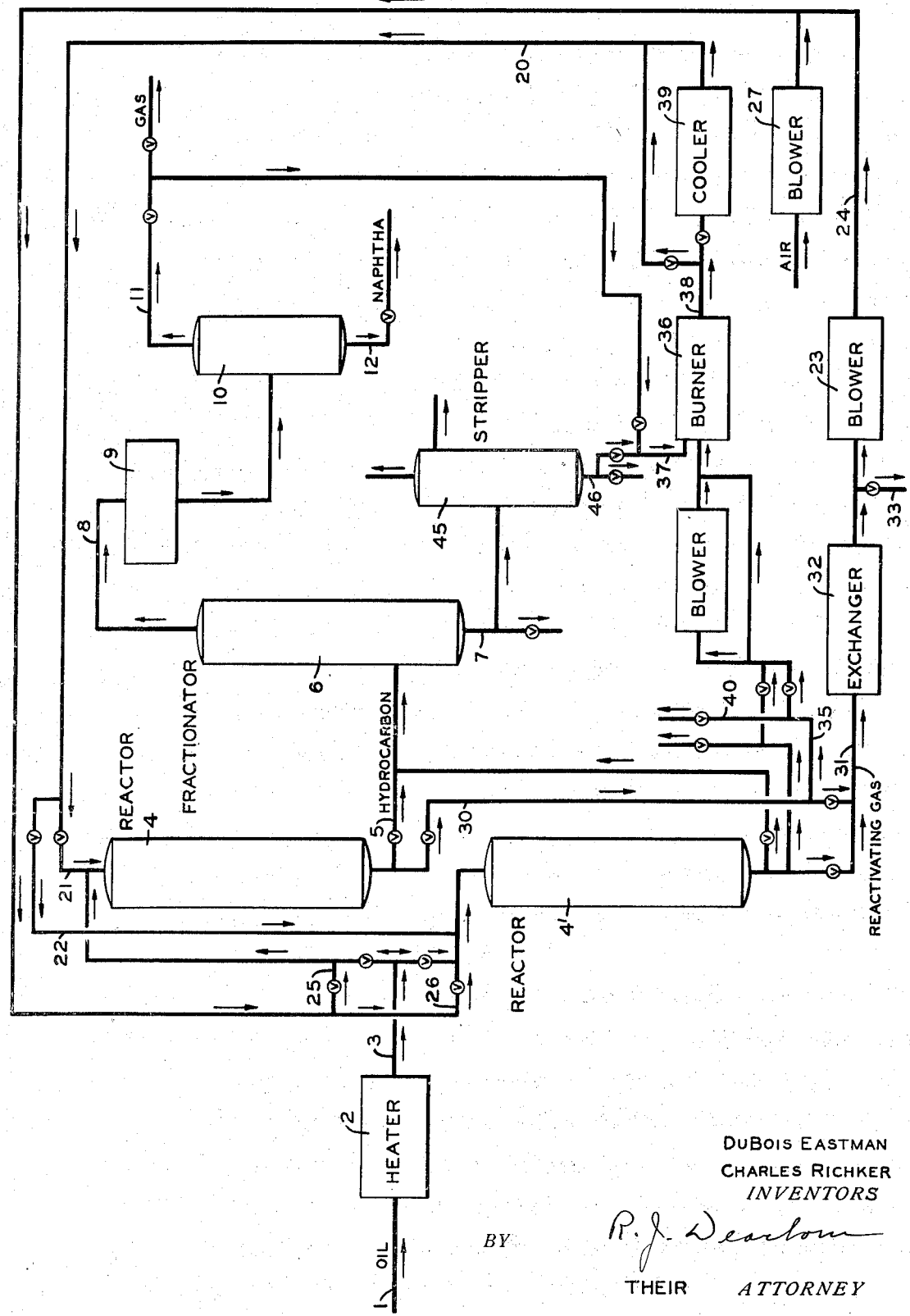
DuBois Eastman
Charles Richker
*INVENTORS*
BY R. J. Dearborn
THEIR ATTORNEY Patented May 16, 1944

2,348,794

UNITED STATES PATENT OFFICE 2,348,794

METHOD OF CATALYTIC CONVERSION OF HYDROCARBONS

Du Bois Eastman and Charles Richker, Port Arthur, Tex., assignors to The Texas Company, New York, N. Y., a corporation of Delaware Application May 26, 1942, Serial No. 444,540

3 Claims. (Cl. 196—52)

This invention relates to a method of catalytic conversion of hydrocarbons and particularly with respect to the regeneration of the catalyst employed in the conversion of hydrocarbons such as in the thermal conversion of petroleum hydrocarbons.

The invention has to do with the catalytic conversion of hydrocarbons and particularly the catalytic conversion of petroleum hydrocarbons for the production of motor fuel, by a process substantially similar to that described in pending application Serial No. 355,568, filed September 6, 1940, for Method of and apparatus for the catalytic conversion of hydrocarbons. As there disclosed, oil heated to a conversion temperature is subjected to contact with two or more catalyst masses alternately, one mass undergoing contact with the oil during onstream operation while another mass undergoes regeneration during off-stream operation.

The offstream catalyst mass is regenerated in situ under elevated pressure by contact with a reactivating gas containing a small amount of oxygen, the flow of flue gas and its oxygen content being such as to effect regeneration at a temperature not in excess of that at which the catalyst would be injured and such that substantially all of the exothermic heat of regeneration is removed as sensible heat of the gas issuing from the mass.

The sensible heat is continuously removed from the issuing gas without substantial reduction in the pressure of the gas. The major proportion of the cooled gas is continuously recycled through the mass during regeneration by means of a turbine driven impeller while that portion not so cycled is utilized as a fluid actuating means for the turbine. In other words the non-recycled portion of the gas, still under elevated pressure, is expanded through the turbine to substantially atmospheric pressure, thereby causing the turbine to rotate and thus operate the impeller.

The invention of the present application has to do with the further treatment of the oxygen-bearing effluent gas from the reactor at the completion of reactivation of the contact mass therein. Upon completion of reactivation of the contact mass the regenerating gas leaving the reactor will contain unconsumed oxygen. In fact, the appearance of oxygen in the exit gas is usually regarded as an indication that reactivation of the contact mass is complete or substantially complete.

Instead of discharging this portion of the gas to the atmosphere, the present invention contemplates subjecting it to contact with an oxidizable material so as to convert the free or unconsumed oxygen to flue gas and thereafter recycling the gas through the reactivated mass for the purpose of purging the mass of any retained oxygen.

An important advantage of this method of operation is that it avoids the necessity for maintaining a separate supply of oxygen free flue gas for purging the system.

In accordance with the invention the effluent flue gas containing free oxygen is passed through a combustion zone wherein a small amount of hydrocarbon gas or oil is injected at a temperature above that required for ignition of the gas or oil. The introduction of a gas or oil and the temperature within the combustion chamber is controlled so as to completely consume the small amount of oxygen contained in the effluent gas. The resulting gas mixture with or without cooling is recycled through the reactivated contact mass for the purpose of purging it.

In the thermal conversion of hydrocarbons, catalytically, the oil, preferably in vaporized form and heated to a conversion temperature, for example, in the range 850 to 1000° F., is passed through a catalyst case containing a solid pulverulent mass of the catalyst. Various catalysts may be employed as, for example, natural and synthetic silica-alumina catalysts. Specific examples of suitable catalysts will be mentioned later.

During the conversion treatment, higher molecular weight hydrocarbons contained in the feed are converted to lower molecular weight hydrocarbons boiling within the range of ordinary motor fuel. Such conversion is accompanied by the formation of normally gaseous hydrocarbons as well as a certain amount of carbon or carbonaceous material. This carbonaceous material is deposited upon the catalyst particles and as a result of continued carbon deposition the catalyst becomes reduced in effectiveness so that it is necessary to regenerate the catalyst at intervals in order to restore its effectiveness in the conversion reaction.

Regeneration usually involves subjecting the catalyst to contact with an oxygen containing gas so as to remove the carbonaceous deposit by combustion. Accordingly, two or more cases containing catalyst material are maintained in service, one being kept onstream during conversion, while another is offstream undergoing regeneration.

During such regeneration it is essential to avoid subjecting the catalyst to overheating which would cause it to deteriorate and lose its effectiveness. The present invention is concerned particularly with a method of regenerating the catalyst and maintaining it in a highly effective state in the conversion of hydrocarbons.

While cracking has been specifically mentioned it is, of course, contemplated that the invention may be applied to various types of catalytic reactions wherein during the course of the reaction the catalyst loses its effectiveness and must be restored to its active state by regeneration with an oxygen containing gas and during which regeneration a substantial amount of heat is liberated.

The invention will now be described in more detail by reference to the accompanying drawing.

The gas oil charging stock obtained from a source not shown is conducted through a pipe 1 to a heater 2 advantageously of the coil or tubular type wherein the oil is vaporized and heated to a temperature ranging from about 900 to 1000° F.

The heated oil vapors pass from the heater through a pipe 3 communicating with the upper portions of catalyst cases 4 and 4'. The catalyst cases comprise vertical vessels containing a mass of solid catalytic material in fragmentary form such as particles, lumps, pellets, powder, etc. A suitable catalyst comprises a synthetic silica-alumina catalyst. The catalyst is advantageously supported within the vessels in the form of comparatively shallow beds one above the other.

The vessels are manifolded together as indicated to permit one vessel onstream while the other is offstream and undergoing regeneration. Thus, the vessel 4 may be regarded as onstream; in which case the heated hydrocarbon vapors pass downwardly through the catalyst mass within the vessel during which passage the hydrocarbons undergo conversion. The products of reaction are removed from the bottom of the vessel 4 and are drawn off through a pipe 5, leading to a fractionator 6.

In the fractionator 6 the converted hydrocarbons are subjected to fractionation to form a vapor fraction containing gasoline hydrocarbons and normally gaseous hydrocarbons and a higher boiling liquid fraction comprising gas oil which latter is drawn off through a pipe 7 for such further disposition as may be desired.

The vapor fraction is drawn off from the top of the fractionator through a pipe 8 to a condenser and cooler 9. The resultant condensate and uncondensed gases are drawn off to an accumulator 10. Gaseous constituents collecting in the accumulator are drawn off through pipe 11 from which they may be passed to a further processing step which may include, for example, further fractionation and catalytic treatment of various constituents thereof.

The liquid portion collecting in the accumulator is drawn off through a pipe 12 for such further treatment as may be desired and which may include stabilization and/or contact with a refining catalyst. The flow of hydrocarbons through the vessel 4 is continued for a period of several hours or more as for example 3 or 4 hours to 8 hours or more until it becomes desirable to regenerate the catalyst as evidenced by substantial reduction in the rate of conversion. Shorter conversion periods of less than one hour may be employed if desired.

When regeneration becomes necessary the flow of hydrocarbon vapors is switched from the vessel 4 to the vessel 4' containing fresh or regenerated catalyst. This is accomplished by adjusting the valves in the pipe manifolds leading into and away from the vessels 4 and 4'. The vessel 4 is then offstream during which time the catalyst contained therein undergoes regeneration.

The hydrocarbon conversion reaction is effected advantageously under relatively low pressure, for example, about atmospheric pressure up to about 35 pounds per square inch gauge, although higher pressures up to 100 pounds may be employed. On the other hand regeneration of the spent catalyst is effected advantageously under elevated pressure, for example, about 100 pounds per square inch gauge or more.

Consequently, in order to effect regeneration following conversion at low pressure it is necessary after purging the offstream catalyst case to raise the pressure within the offstream portion of the system to that prevailing during regeneration.

Purging of the offstream catalyst case can be effected by means of flue gas delivered through a pipe 20 from a source which will be referred to later.

The pipe 20 terminates in branch pipes 21 and 22 communicating with vessels 4 and 4' respectively, as indicated in the drawing.

The purpose of introducing purge gas from the pipe 20 to the offstream vessel is to displace and remove hydrocarbons retained in the contact mass at the time the vessel is taken offstream from the hydrocarbon conversion reaction. The purge gas and displaced hydrocarbons may be discharged directly through the pipe 5 to a fractionator 6 so that the hydrocarbons can be recovered in the normal operation of the fractionator.

Regeneration is carried out by means of reactivating gas delivered from a blower 23 through a pipe 24 terminating in branch pipes 25 and 26 which in turn provided a means for introduction to the vessels 4 and 4' respectively.

The flue gas used to form the reactivating stream of gas comprises flue gas produced during the combustion of the carbonaceous deposit upon the catalyst as will be described later.

Air is injected in the flue gas passing through the pipe 24 and this may be done by means of a separate blower or compressor 27.

Assuming that the vessel 4 is offstream for regeneration and has been purged of its hydrocarbon content as already explained, the valves in the flow lines are adjusted so as to permit flow of reactivating gas through the vessel 4 without interfering with the flow of hydrocarbons through the vessel 4' and the fractionator.

Thus, the flue gas containing a small amount of oxygen is delivered through the pipe 24 and the branch pipe 25 into the top of the vessel 4, the pressure being permitted to build up to the normal regeneration pressure.

The gas issuing from the vessel 4 is passed through a branch pipe 30 communicating with a pipe 31 leading to a heat exchanger, waste heat boiler or other apparatus 32 for removing sensible heat from the effluent gases. The gases are thus reduced to a temperature of about 900 to 950° F. prior to introduction to the suction of the previously mentioned blower 23.

Due to the presence of oxygen in the reactivating gas carbonaceous material deposited on the offstream catalyst is removed from the catalyst by combustion. The rate of flow and the oxygen content of the circulating gas is adjusted so as to avoid too rapid combustion which would cause excessive rise in temperature of the catalyst mass. Sufficient volume of inert gas is passed through the catalyst mass undergoing regeneration to absorb the exothermic heat of regeneration and remove it therefrom as sensible heat of the gas issuing from the catalyst mass and passing into the pipe 31. More specifically, conditions are maintained such that substantially all of the exothermic heat of regeneration is removed as sensible heat in the gas while maintaining the temperature of the catalyst mass not in excess of about 1200° F.

The amount of air introduced to the pipe 24 from the blower 27 is such that the oxygen content of the reactivating gas returning to the offstream contact mass will be about 1 to 2% by volume.

At the outset the temperature of the regenerating gas passing to the catalyst mass should be sufficiently high, usually about 900 to 950° F., to initiate combustion. Once combustion is commenced the temperature of the entering gas may be advantageously reduced say to about 750 to 850° F. and sufficient to maintain combustion, the temperature of the mass undergoing regeneration not being permitted to exceed about 1200° F. As regeneration nears completion it may be necessary to increase the temperature of the entering gas to about 950° F. or even higher in order to complete the combustion.

It is desirable to adjust the temperature of the entering gas to keep it at the minimum necessary to support combustion since the lower the temperature at which it enters the catalyst mass the greater is its heat absorbing capacity.

Excess flue gas may be released from the system through a valve controlled pipe 33. If desired, a portion of this gas so discharged from the system may be expanded through a suitable turbine which in turn may be employed to operate the blower 23 or to operate some other mechanical device.

Completion of regeneration of the catalyst is evidenced by the presence of progressively increasing amounts of oxygen in the effluent reactivating gas. At this point the effluent gas is diverted from the pipe 31 through a branch pipe 35 communicating with a combustion chamber 36 to which is injected a small amount of hydrocarbon oil or gas from a pipe 37. The combustion chamber is maintained at a temperature in the range 900° F. and above so that combustion of the injected hydrocarbon occurs, thereby consuming the oxygen contained in the stream of gas entering from the pipe 35.

The resulting flue gas is removed from the combustion chamber through a pipe 38 and either with or without cooling is delivered to the previously mentioned pipe 20 through which the gas flows to the top of the offstream vessel containing reactivated catalyst.

This gas, as previously explained, flows through the reactivated catalyst mass to displace retained oxygen. Recycling of the gas through the pipe 35, combustion chamber 36, pipe 20 and offstream vessel is continued until the oxygen remaining in the circuit is completely consumed.

The amount of oxygen contained in the effluent gas is usually small so that only a small amount of hydrocarbon or oil need be injected in the combustion chamber 36. Also since the amount of combustion is small the increase in temperature of gas will be small so that it may be recycled as purge gas without cooling. However, if cooling is necessary this may be accomplished by passing the gas from the pipe 38 through a cooler 39 prior to introduction to the previously mentioned pipe 20.

During this purging operation or immediately thereafter the pressure within the offstream vessel may be relieved by discharging the purging gas from the system through a valve controlled pipe 40, the amount and rate of such gas so discharged being adjusted so as to gradually reduce the pressure within the offstream vessel to the level prevailing during onstream conversion of hydrocarbons.

The hydrocarbon gas or oil injected in the combustion chamber 36 may be derived from products produced in the system during onstream conversion of hydrocarbons. Thus, if gas is employed for this purpose such gas may be drawn off from the previously mentioned pipe 11. On the other hand heavy gas oil may be used such as a component of the higher boiling products of the cracking reaction. Thus, the products boiling above gasoline and drawn off through the previously mentioned pipe 7 from the fractionator 6 may be passed to a stripper 45 wherein low boiling hydrocarbons may be stripped from a residual fraction comprising heavy hydrocarbons. These heavy hydrocarbons are discharged through a pipe 46 and a small portion thereof may be delivered through the previously mentioned pipe 37 to the combustion chamber 36.

While silica-alumina type catalysts have been mentioned it is contemplated that other catalysts may be employed. Various acid-treated and metal-substituted clays, such as the Super-Filtrols, are satisfactory. Likewise, the acid-treated and metal-substituted natural or artificial zeolites, such as the artificial zeolite known as Doucil, can be used. Various metals can be substituted in the clays or zeolites, such as uranium, molybdenum, manganese, lead, zinc, zirconium, nickel and the like. Likewise, the combination of certain acid-treated active clays of the character of Filtrol, together with added proportions of alumina or silica or both can be employed. Alumina alone may be used under certain conditions. The synthetic silica-alumina catalysts can be improved by the addition of other constituents, such as zirconium oxide or molybdenum oxide. In general, a catalyst is employed which is stable at high temperatures of the order of 1400–1600° F., as determined by calcining in a muffle furnace at that temperature, and which is a measure or indication of the ability of the catalyst to maintain its activity under the customary temperatures of reactivation of the order of 1000–1400° F., as measured by thermocouples within the catalyst bed during the reactivation period. It is preferred to employ a catalyst which is substantially free from alkali and alkaline earth metals. By way of specific example, a very satisfactory catalyst is a synthetic silica-alumina-zirconia mixture.

While the maintaining of certain specified pressures has been mentioned above, it is contemplated that the pressure employed in the processing, purging and regenerating steps of the process may be either higher or lower than those disclosed above. If desired, substantially the same pressure may be used throughout the entire process.

While catalytic cracking has been specifically described, it is also contemplated that the invention is applicable to other catalytic treating processes such as dehydrogenation, for example.

Obviously many modifications and variations of the invention, as hereinbefore set forth, may be made without departing from the spirit and scope thereof, and therefore only such limitations should be imposed as are indicated in the appended claims.

We claim:

1. In the conversion of hydrocarbon oil by contact with a catalytic mass at elevated temperature wherein the oil heated to a conversion temperature is passed through each of two contact masses alternately, one mass being onstream during passage of the oil therethrough, while the other mass is offstream undergoing regeneration to remove carbonaceous material deposited upon the catalyst during contact with the heated oil in onstream flow, the method of regenerating the offstream mass which comprises purging the offstream mass to remove retained hydrocarbons, thereafter passing a continuous stream of flue gas containing a small amount of free oxygen through the purged contact mass, the oxygen content and the volume of flow of the gas being such as to burn the carbonaceous material slowly and to remove the heat of combustion substantially entirely in the form of sensible heat of the gas issuing from the mass, removing sensible heat from the issuing gas, recycling cooled gas through the contact mass, continuing the passage of reacting gas through the mass until the carbon is substantially completely removed therefrom and the effluent gas stream contains some residual free oxygen, injecting in said stream of effluent gas containing free oxygen a small amount of hydrocarbons, passing said gas stream and injected hydrocarbons through a separate zone of combustion in the absence of said catalytic material whereby free oxygen is consumed by reaction with injected hydrocarbons, recycling the so treated effluent gas to the contact mass, continuing said recycling through the contact mass and separate combustion zone until the mass is purged of free oxygen and thereafter re-establishing the flow of heated hydrocarbon through the mass.

2. The method according to claim 1 in which the regeneration is effected under a pressure substantially greater than that prevailing during hydrocarbon conversion.

3. The method according to claim 1 in which the hydrocarbons injected into the effluent gas stream comprise hydrocarbon products of the cracking reaction boiling outside the range for gasoline.

DU BOIS EASTMAN.
CHARLES RICHKER.

DISCLAIMER 2,348,794.—*Du Bois Eastman* and *Charles Richker*, Port Arthur, Tex. METHOD OF CATALYTIC CONVERSION OF HYDROCARBONS. Patent dated May 16, 1944. Disclaimer filed January 3, 1945, by the assignee, *The Texas Company*.
Hereby disclaims claims 1 and 3 of said patent.
 [*Official Gazette January 30, 1945*]